Aug. 20, 1935.　　　　J. P. GREEN　　　　2,012,190

REFRIGERATING DEVICE

Filed Jan. 30, 1934　　　2 Sheets-Sheet 1

Inventor:
John P. Green
by his Attorneys
Howson & Howson

Aug. 20, 1935.  J. P. GREEN  2,012,190
REFRIGERATING DEVICE
Filed Jan. 30, 1934  2 Sheets-Sheet 2
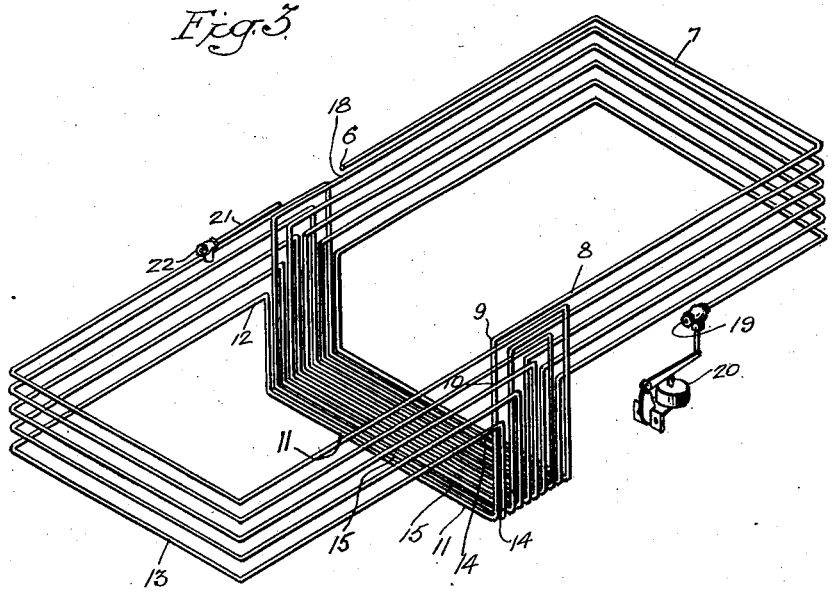
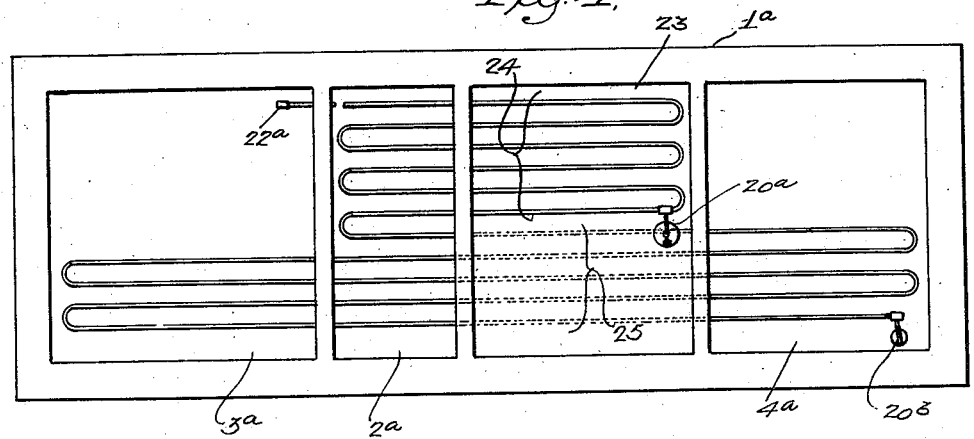
Inventor:
John P. Green
by his Attorneys
Howson & Howson Patented Aug. 20, 1935

2,012,190

UNITED STATES PATENT OFFICE 2,012,190

REFRIGERATING DEVICE

John P. Green, Philadelphia, Pa.

Application January 30, 1934, Serial No. 709,021

5 Claims. (Cl. 62—91.5)

This invention relates generally to refrigeration or cooling systems and is particularly directed to refrigeration using as a primary refrigerant substances wherein the products of the refrigerating media are exhausted and not recompressed.

An object of the invention is to provide a system which makes practical the use of solid carbon dioxide, commonly known as "dry ice", or similar substances, for various purposes where close control of the resultant temperature is desired throughout all seasons of the year.

In accordance with the invention there is provided a practical method and system for using this type of refrigerant which eliminates the objection of varying temperatures within the compartments to be cooled by accurately controlling the sublimation or vaporization process in accordance with the temperature within the compartment or region cooled. The sublimation or vaporization process is varied by varying the transfer of heat between the primary refrigerant and the compartments to be cooled according to the temperature within these compartments. Various modifications of this method and system are possible as will be evidenced by the following detailed description which, together with the accompanying drawings, discloses the invention in its specific application to an ice cream cabinet refrigerated with solid carbon dioxide.

In the drawings:

Figure 3 is a perspective view of the piping of this cabinet;

Figure 4 is a plan view of a modified form of cabinet, with the covers removed, and showing the piping diagrammatically;

Figure 1:
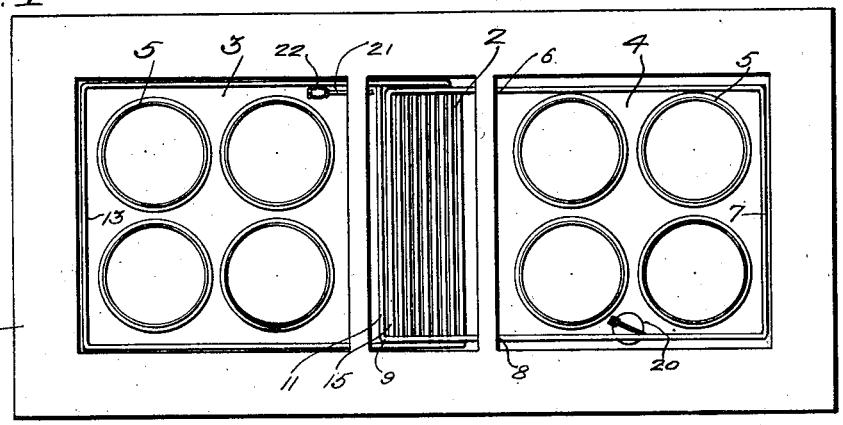
Figure 1 is a plan view of an ice cream cabinet, with the covers thereof removed, designed in accordance with the invention.
Figure 2:
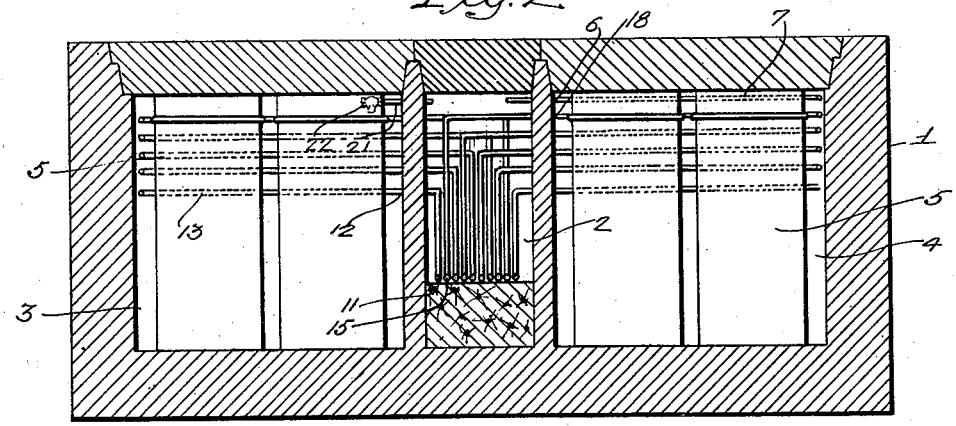
Figure 2 is a sectional elevation of the cabinet.

Referring to Figures 1 to 3 of the drawings, there is illustrated a simple application of the principles of the invention. An ice cream cabinet is shown at 1, which comprises a central compartment or chamber 2, adapted to contain the refrigerant, and side compartments or chambers 3 and 4, adapted to hold the ice cream cans 5. These compartments of the cabinet are insulated so as to reduce the heat transfer from the outside to a minimum. Compartments 3 and 4 and compartment 2 are sufficiently insulated from each other so that when the external temperature around the cabinet is at a minimum and compartment 2 is completely filled with the refrigerant, the heat transfer directly through the walls will not cause the temperature in compartments 3 and 4 to drop below the minimum desired. The compartments are of course provided with lids or covers to permit the filling of the cabinet and access to the ice cream and ice cream cans. The lid on compartment 2 is sufficiently sealed so that a small amount of pressure can be maintained on the same without causing the gas therein to directly escape.

In accordance with the invention there is provided a piping or conduit system which is shown more clearly in Figure 3. The piping is in communication with and leaves the central refrigerant chamber 2 at a point 6 of the said chamber. It passes into compartment 4 and is formed into a loop 7 within the said compartment. The pipe re-enters the central refrigerant compartment at a point 8 and traverses the compartment, as at 9 and 10, passing along the bottom of the refrigerant compartment, as at 11. After crossing the compartment, the pipe again leaves the same at a point 12, and then passes through compartment 3 in a loop 13 similar to loop 7, returning to the refrigerant compartment at a point 14. The pipe then passes again along the bottom of the refrigerant compartment, as at 15, to a point 18. The pipe continues in this fashion, being formed into successive loops similar to loop 7 and 13, in compartments 3 and 4. After completing each loop, the pipe passes into the refrigerant compartment, along the bottom thereof. As will be seen, the piping consists of successive alternate passages from the refrigerant compartment 2 into the compartments 3 and 4. The number of loops or passages in each compartment is determined by the particular requirements. For the purpose of illustration, an arbitrary number of loops have been used.

The piping may terminate at a point in either of the compartments 3 and 4 or it may terminate outside of either of them. In the illustration, the terminating point is shown at 19 in compartment 4. There is provided at this point a thermally operable valve 20 which is adapted to open and close the passage through the piping. This valve may be of any suitable conventional form. An outlet pipe 21, independent of piping 7, leads from the compartment 2 into either of the compartments 3 and 4, or if desired to the outside air, and is provided with a pressure valve 22 of suitable construction, so that if the pressure within compartment 2 rises to a predetermined maximum it will be vented, preventing an excess of pressure within compartment 2.

The purpose of the piping system and control valves is to control the rate of sublimation in accordance with the temperature in compartments 3 and 4, and to prevent the building up of excessive gas pressure in compartment 2. Considering Figure 3, the gas from the refrigerant is conveyed through the various conduits 7 and 13 through compartments 3 and 4; the gas, after each passage and between successive passages, passing back through the refrigerant compartment. During its passage through each of the loops, the gas absorbs an amount of heat from the compartments 3 and 4, lowering their temperature, and carries this heat back into the refrigerant compartment 2, where it is absorbed by the primary refrigerant, causing the sublimation or vaporization thereof. As the return piping passes along the bottom of the refrigerant compartment 2 and the primary refrigerant is placed upon the conduits 11, 15 etc., direct contact is made with the refrigerant upon each return, when the fluid refrigerant gives up approximately the same amount of heat as it absorbed in a traversed loop; and being cooled before it again leaves the refrigerant compartment, the fluid refrigerant is in a condition to reabsorb heat during its passage through each succeeding loop. A sufficient number of these loops are positioned in compartments 2, 3, and 4 so that with the passage of a given amount of fluid through them, enough heat is carried into compartment 2 to cause the generation of an equal or greater amount of fluid.

The flow of the gas through the loops 7 and 13 is controlled by valve 20 which is operated in accordance with the temperature within compartment 3 or 4. As long as the temperature in these compartments is at or approximates the desired minimum, the valve 20 will be closed and the sublimation or vaporization process will be substantially interrupted, except for the sublimation which is caused by the transfer of heat through the walls of compartment 2. At this time, the pressure within the refrigerant compartment 2 is relieved by the opening of the pressure control valve 22. When the temperature within the compartment 3 or 4 rises toward the predetermined maximum, valve 20 opens, permitting the flow of gaseous refrigerant through the piping system. This causes heat to be absorbed within compartments 3 and 4 and transmitted into compartment 2, where it causes the primary refrigerant to sublime or vaporize at an increasing rate. As a result, the temperature within compartments 3 and 4 is lowered until the desired minimum is reached, at which time valve 20 closes. During the period when valve 20 is open and the gaseous refrigerant is flowing, relieving the pressure within compartment 2, the pressure valve 22 will be closed and there will be no escape of gas other than through the piping and valve 20. If compartments 3 and 4 are similar and are similarly related to the refrigerant compartment, and the temperatures desired in each are substantially the same, a single control valve positioned in one of these compartments may be used. If it is desired, however, to refrigerate only a single compartment, all of the piping loops 7 and 13 and control valve 20 may be positioned within the same, as described more fully hereinafter.

As previously stated, the number of loops or passages in the piping system will depend upon the specific requirements. The number of loops should be sufficient, however, to cause a rate of sublimation sufficient to absorb the amount of heat which will pass into the cabinet under maximum service and external temperature conditions.

The thermal valve 20 need not be located at the discharge end of the piping system, as illustrated on the drawings, but may be located at any point along that system. For example, this valve could be located at point 6 where the piping initially leaves the refrigerant chamber. It should also be noted that the thermal valve 20 in reversed form may be used in place of pressure valve 22 and vice versa. In such case, the thermal valve will control the relief of pressure from the refrigerant compartment, while the pressure valve will control the flow of gaseous refrigerant through the piping system.

As gaseous carbon dioxide is not usually injurious to food products, the gas may be exhausted from the piping system and through the pressure relief valve directly into the compartments to be cooled. This may be desirable because the exhausted gas still has useful cooling properties. When, however, the refrigerant used is injurious to the products in the compartments, the gas may be exhausted directly into the atmosphere or other suitable point. It is to be understood that the invention while particularly directed to the use of solidified carbon dioxide is capable of being used with any other suitable refrigerant.

In Figure 4, there is shown diagrammatically the application of the invention to the maintaining of different temperatures in different compartments. An ice cream cabinet is shown at 1a which comprises a refrigerant chamber 2a and compartments 3a, 4a and 23. The device is designed to maintain a desired temperature in compartments 3a and 4a and to maintain a different temperature within compartment 23. To achieve this purpose, there is provided a piping system 24 consisting of loops or passages between compartment 23 and the refrigerant compartment 2a, similar to the system above described. The piping is shown in this instance diagrammatically, it being understood that it would take some such form as illustrated in the previously described figures. A thermally operated valve 20a is positioned in compartment 23 and is adapted to control the flow of gaseous refrigerant through the piping system 24 and the exhausting of the gas to maintain compartment 23 at a desired temperature. A gas outlet valve 22a is provided as before for the purpose above described.

The piping system 25 is adapted to maintain compartments 3a and 4a at a different temperature. This piping system is substantially identical with the system shown in Figure 3, there being successive loops in each of the cooling compartments. The broken line portions of the piping indicate that piping system 25 does not necessarily pass into compartment 23 but may pass around the same, as temperature and conditions necessitate. A thermal valve 20b controls the flow of the refrigerant through system 25 and the exhausting of the gas from the same. The piping system 25 may be formed as a continuation of the system 24, as illustrated in Figure 4, or the two systems may be separate and independent. In either case the thermal valves 20a and 20b control the flow of the refrigerant in their respective systems. It will be understood that the illustration of Figure 4 is only diagrammatic and is intended only to illustrate the general modified arrangement. It is deemed unnecessary to illustrate this modified form of the device in further detail.

Figure 5:
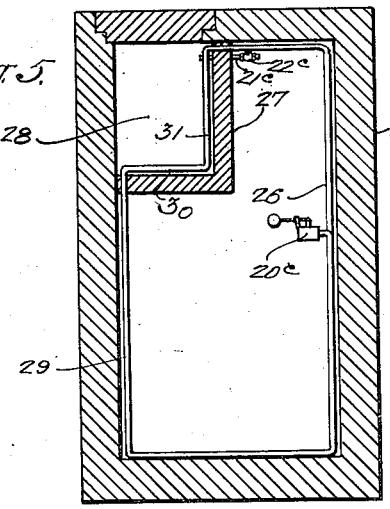
Figure 5 is a sectional elevation of a further modification.
Figure 6:
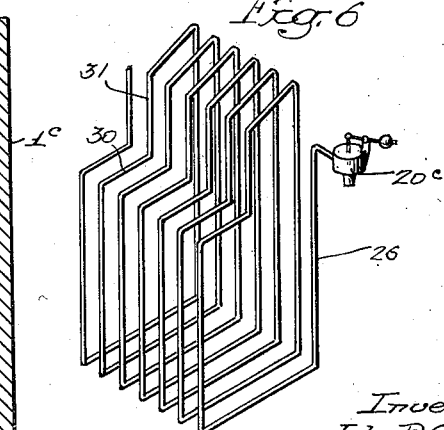
Figure 6 is a perspective view of the piping system of the same.

In Figures 5 and 6, there is illustrated a simple system comprising a cabinet *Ic* and a piping system 26. The heat-insulated walls 27 divide the cabinet into chambers or compartments 28 and 29, the former being the refrigerant chamber and the latter the storage chamber. The piping passes successively into the compartments as illustrated, the horizontal and vertical sections 30 and 31 passing through the refrigerant chamber, and the remainder of the piping passing in loops through the storage chamber. A thermal control valve 20c is provided, as is also an outlet pipe 21c and a pressure relief valve 22c. As will be seen, this simple embodiment is merely the application of the principles of the invention to control of a single region or compartment. The operation will be understood from the foregoing description. This embodiment is, of course, capable of modification as previously set forth.

Although the various illustrated embodiments show a single refrigerant chamber, the invention is obviously applicable to cabinets having more than one such chamber. For instance, meat cabinets are commonly formed with two spaced refrigerant compartments with a storage compartment between them. In such case the piping may be run successively through all of these various compartments.

While the piping arrangement illustrated is preferred, where there are a plurality of compartments to be cooled, the piping may completely traverse one compartment in successive loops or passes before traversing another compartment. Of course, the alternate passages between a compartment and the refrigerant chamber will be maintained.

The invention is not limited to refrigeration, but is applicable to cooling in general and may be used wherever practical.

I claim:

1. In a refrigerating or cooling system, a refrigerant chamber, a region to be cooled, heat-insulating means between said chamber and said region, means for retaining the pressure generated by the refrigerant in said chamber, means for passing fluid generated by the refrigerant successively and repeatedly through said region and said chamber, said last means comprising a conduit of relatively small cross-sectional area passing in successive loops through said region and said chamber, and means for thermally controlling the flow of the fluid.

2. In a refrigerating or cooling system, a refrigerant chamber, a region to be cooled, heat-insulating means between said chamber and said region, means for retaining the pressure generated by the refrigerant in said chamber, means for passing fluid generated by the refrigerant in successive different paths through said region and said chamber, means responsive to the temperature of said region for controlling the flow of the fluid, and means for relieving the pressure in said chamber.

3. In a refrigerating or cooling system, a refrigerant chamber, a plurality of compartments to be cooled, heat-insulating means between said chamber and said compartments, means for retaining the pressure generated by the refrigerant in said chamber, means for passing fluid generated by the refrigerant in successive different paths through said compartments and said chamber, means responsive to the temperature in said compartments for controlling the flow of the fluid, and means for relieving the pressure in said chamber.

4. In a refrigerating or cooling system, a refrigerant chamber, a plurality of compartments to be cooled one on each side of said chamber, heat-insulating means between said chamber and said compartments, means for retaining the pressure generated by the refrigerant in said chamber, means for passing fluid generated by the refrigerant alternately through said compartments and through said chamber after each passage through a compartment, means for thermally controlling the flow of fluid through said compartments, and means for relieving the pressure in said chamber.

5. A method of refrigeration or cooling, which consists in passing fluid generated by a refrigerant in successive different paths through one or more regions to be cooled and a chamber containing the refrigerant, and thermally controlling the flow of the fluid in accordance with the temperature of a region to be cooled.

JOHN P. GREEN.